Figure 1:
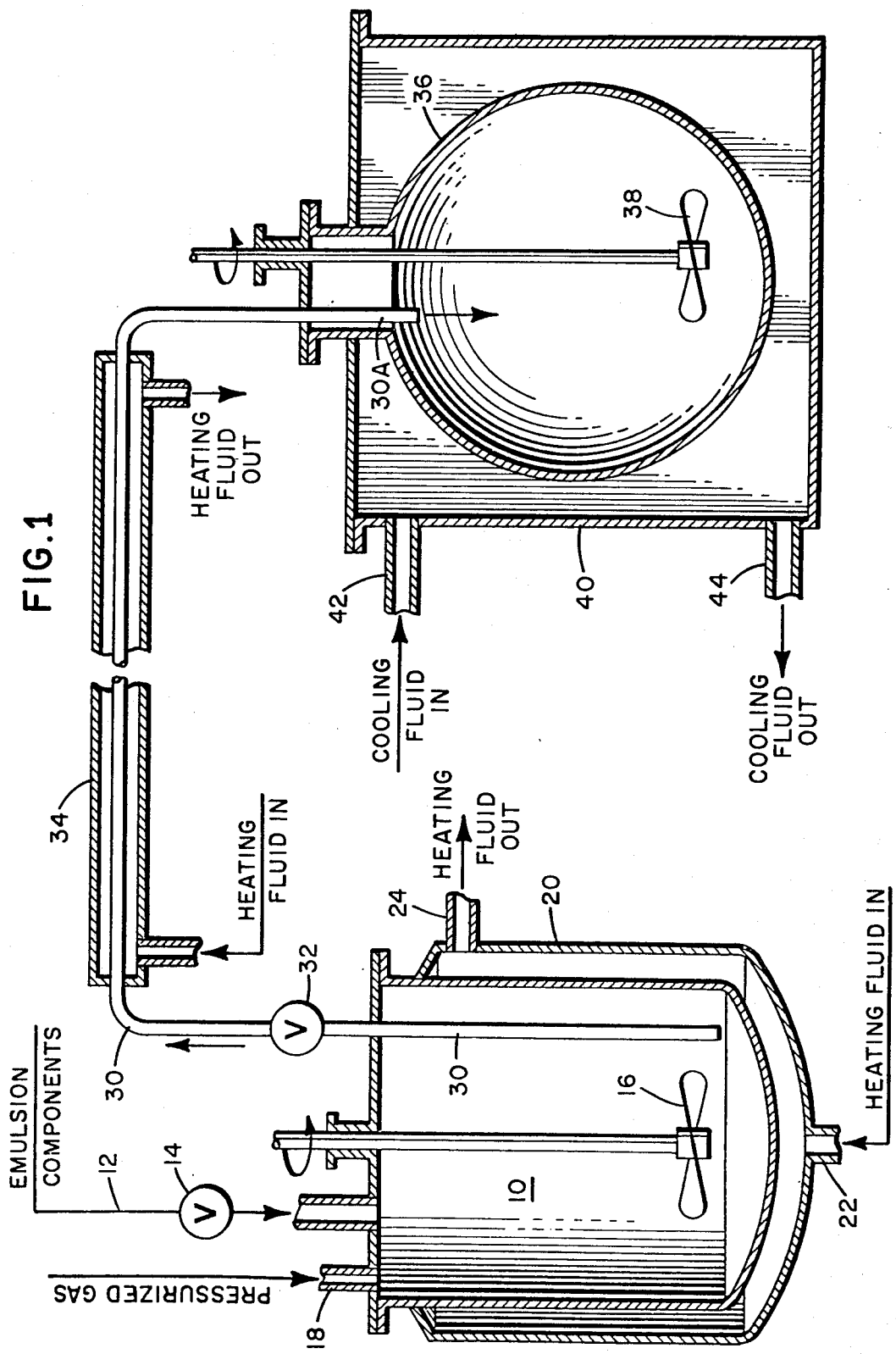

United States Patent [19]

Ferraris et al.

[11] Patent Number: 4,469,648

[45] Date of Patent: Sep. 4, 1984

[54] PROCESS FOR PREPARING SPHEROIDALLY SHAPED PRODUCTS, SOLID AT ROOM TEMPERATURE

[75] Inventors: Mario Ferraris, Novara; Francesco Rosati, Milan, both of Italy

[73] Assignee: Montedison S.p.A., Milan, Italy

[21] Appl. No.: 442,673

[22] Filed: Nov. 18, 1982

Related U.S. Application Data

[63] Continuation-in-part of Ser. No. 236,062, Feb. 19, 1981, abandoned, which is a continuation of Ser. No. 47,908, Jun. 12, 1979, abandoned.

[30] Foreign Application Priority Data

Jun. 13, 1978 [IT] Italy .............................. 24509 A/78

[51] Int. Cl.³ .............................................. B01J 2/06
[52] U.S. Cl. ......................................... 264/9; 264/14
[58] Field of Search ...................... 264/5, 9, 14

[56] References Cited

U.S. PATENT DOCUMENTS 3,308,211  3/1967  Plastridge ............................. 264/5
3,389,194  6/1968  Somerville ............................ 264/5
4,042,374  8/1977  Rasmussen et al. ................. 264/5

Primary Examiner—James R. Hall

[57] ABSTRACT

Solid products of spheroidal shape and having a maximum diameter of 1 to 5,000 microns are prepared starting from a mixture of at least two immiscible, mutually chemically inert liquids, one of which is in the form of a molten solid, said liquids being prsent in the mixture in a ratio such that one forms the dispersed phase while the other is the continuous phase, at least the liquid forming the dispersed phase being one which solidifies on cooling.

6 Claims, 2 Drawing Figures

PROCESS FOR PREPARING SPHEROIDALLY SHAPED PRODUCTS, SOLID AT ROOM TEMPERATURE

This is continuation in-part of application Ser. No. 236,062 filed Feb. 19, 1981, now abandoned, which in turn is a continuation of Ser. No. 047,908 filed June 12, 1979 and now abandoned.

THE PRIOR ART

The most widely used process for preparing solid granules or spheres from a molten product is called "spray-cooling" and involves atomization of the molten product. Such atomization can be achieved by means of a nozzle or turbine and crystallization occurs by cooling with a flow of cold gas circulating in equi- or counter-current.

By the "spray-cooling" technique it is quite easy to obtain, in a solid form and with a narrow particle size distribution, not only products that are solid at room temperature but also products which melt at temperatures higher than 250° C.

However, it is more difficult and more expensive to obtain, by "spray cooling", solid spheroidal particles from molten products that have long crystallization times. The long crystallization time means lengthening of the course the small drops of atomized molten product must travel in contact with the cooling gas used to effect the solidification of the small drops of the atomized molten product. In such a case, the "spray-cooling" columns must be of considerable height which can be as great as 80 meters, with the consequent danger of polluting the environment and the atomsphere if the exhaust gases are not scrubbed or washed to effectively withhold the fine solids entrained by the exhaust gases. The high "spray-cooling" columns represent an appreciable investment, which renders uneconomical the use of the "spray-cooling" technique for obtaining solid spheroidal particles from the molten products having long crystallization times.

THE PRESENT INVENTION

One object of this invention is to provide a new process for preparing solid spheroidal particles starting from molten products having long crystallization times, and which does not have the drawbacks of the known "spray-cooling" process.

This and other objects are accomplished by the present invention in accordance with which solid, spheroidal particles of a starting liquid in the form of a molten solid are obtained by mixing said liquid homogeneously with at least one other liquid which is immiscible with, and chemically inert to, the liquid in the form of a molten solid, the liquids being present in a ratio such that one forms the dispersed phase while the other is the continuous phase, at least the one forming the dispersed phase being solidified by cooling; and then quenching the mixture of the two phases to cause solidification of the dispersed phase.

In general, the liquid forming the dispersed phase is present in a ratio comprised between 0.5 and 50% by weight with respect to the dispersing liquid.

More specifically, the process for converting molten products into spheroidally shaped products solid at room temperature and having a diameter of from 1 to 5000 microns, consists in forming a homogeneous mixture of the molten product with at least one liquid immiscible therewith and chemically inert thereto and in a ratio such that the molten product will form a dispersed phase and the liquid mixed therewith will form a continuous phase, subjecting the mixture to turbulent flow to obtain an emulsion, quenching the emulsion to solidify the dispersed phase, and collecting the initially molten product in the form of the solid, spheroidal particles resulting from the quenching.

A preferred method for obtaining the emulsion of the immiscible liquid phases consists in passing the mixture thereof through a pipe of suitable length and inner diameter, under conditions of turbulent flow. By "turbulent flow" as used herein, is meant the motion of a fluid in a cylindrical pipe with a Reynolds number greater than 3,000.

At the outlet from the pipe, the emulsion is quenched so as to cause the dispersed phase to undergo an instantaneous change of phase.

The quenching is achieved by mixing the emulsion with a liquid which is inert and does not dissolve the dispersed phase and which is maintained at a suitable cooling temperature and the cooling may take place either in line on the extension of the pipe or in a vessel equipped with a stirrer positioned at the outlet end of the pipe. The quenching liquid may be the same as that constituting the continuous phase of the emulsion.

The pipe in which the emulsion is formed has a length greater than 50 to 100 times the inner diameter of the pipe.

On the inner diameter of the pipe depends the output capacity of the process and not the maximum diameter, which is not influenced at all, of the spheroidal particles that are formed in the emulsion. At any rate, the inner diameter of the pipe must be at least 3-4 times the maximum diameter of the spheroidal particles to be obtained.

Under the operating temperature conditions, the maximum diameter of the spheroidal particles that can be obtained is a function of the linear speed of the emulsion during the flow through the pipe, of the interfacial tension that exists between the liquids, of the density and viscosity of the dispersing medium and of the viscosity of the dispersed phase. Among these functions, the most important variables are, however, the linear speed and the interfacial tension.

For a given inner diameter of the pipe in which the emulsion is formed, and given interfacial tension, an increase of the linear speed results in a decrease of the maximum diameter of the solid particles obtainable in spheroidal shape; while, when a constant linear speed is maintained in a pipe having the same diameter, the maximum diameter of the particles decreases with a decrease in the interfacial tension.

As an illustrative example, in order to obtain particles with a maximum diameter lower than 50$\mu$, the process was carried out at linear speeds of the emulsion comprised between 2 and 20 m/sec with liquids having interfacial tensions comprised between 100 and 10 dyne/cm. In this example, the dispersed phase and the continuous phase were present in weight ratios of 0.1–0.3. Obviously, in order to obtain particles with maximum diameters greater than those indicated above and, more particularly, greater than 1000$\mu$, liquids having an interfacial tension greater than 30 dyne/cm should be used at lower linear speeds, in general of between 0.2 and 2 m/sec.

Operating under these conditions it is possible to obtain products with a narrow particle size distribution, in which the maximum diameter can be controlled and maintained below a predetermined value.

Characteristic of these products is that they appear in the form of separated spherical particles having a sphericity factor around 1, but in general comprised between 0.8 and 1.

Because of the high sphericity factor of the particles they have good flowability and a high bulk density.

By the term "sphericity factor" as used herein is meant the ratio between the surface area of the sphere having the same volume as that of the particle and the external surface area of the particle determined experimentally.

In general, the method is applied to organic or inorganic compounds having a melting temperature comprised between 20° and 400° C., such as for instance: urea, thermoplastic polymeric products, waxes, organic or inorganic salt adducts.

In a specific embodiment the process of this invention is applied to the preparation of microspheres of adducts between magnesium halides, in particular magnesium chloride, and alcohols or water, and in general electron-donor compounds either containing or not atoms of active hydrogen, which adducts are useful as carriers for catalysts.

The preparation of the catalysts, starting from these microspheroidal carriers, is carried out, for instance, according to the technique described in British Pat. No. 1,485,234.

The process is, moreover, suitable for the preparation of urea in spheroidal form.

When the dispersing medium is to be used at high temperatures, such as for instance at 300° C., there may also be used substances that are solid at room temperature, in which case there is obtained a dispersion of the dispersed phase in the form of solid spheroidal particles incorporated in a likewise solid continuous phase.

The dispersing liquids may be, in general, aliphatic, aromatic, cycloparaffinic hydrocarbons, water, silicone oil (methylpolysiloxane), organic esters of the type of phthalates and liquid polymers.

Figure 2:
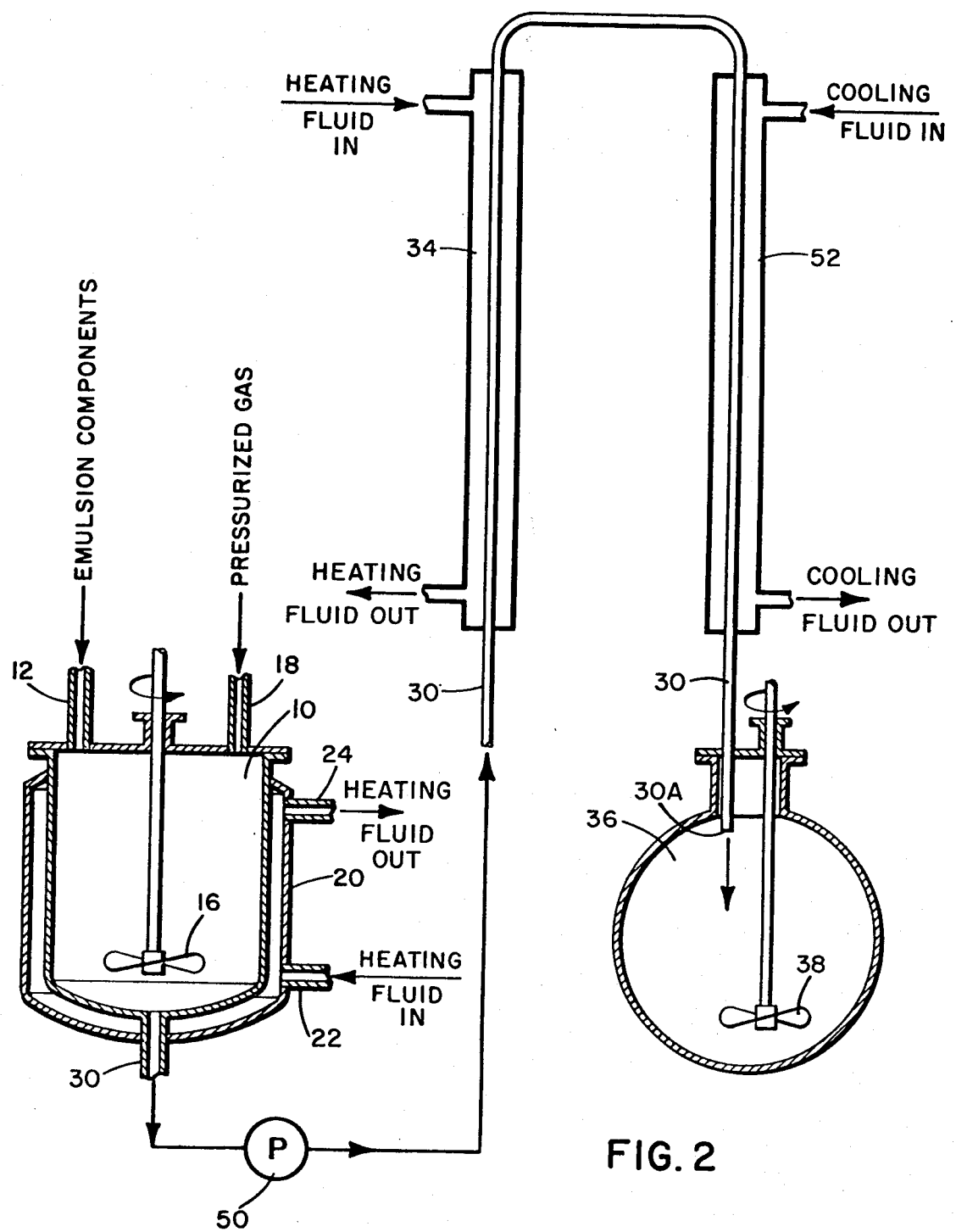

In the accompanying drawing, FIGS. 1 and 2 are schematic showings of apparatus which can be used in the practice of this invention.

Referring to FIG. 1, emulsion components are introduced into a heating vessel 10 through a pipe 12 and a valve 14. Vessel 10 is equipped with a stirrer 16 and may be pressurized by the input of pressurized gas through pipe 18.

Vessel 10 is surrounded by a heating sleeve 20. Heating fluid is introduced into the heating sleeve through pipe 22 and is discharged through pipe 24. The homogeneous mixture formed in vessel 10 is forced out through pipe 30 and valve 32. The temperature of the mixture is maintained during passage to cooling chamber 40 by a heating sleeve 34 surrounding pipe 30.

The mixture is discharged from the end 30A of pipe 30 into a vessel 36 inside cooling chamber 40. Vessel 36 is provided with a stirrer 38. Cooling chamber 40 is supplied with a cooling fluid through inlet 42. Cooling fluid is discharged through outlet 44.

In FIG. 2 the same reference numbers are used to indicate identical parts as used in FIG. 1. The apparatus of FIG. 1 is modified to include a pump 50 to move the mixture to the vessel 36. The cooling chamber 40 is replaced by a cooling sleeve 52 surrounding pipe 30 for a distance sufficient to adequately cool the mixture before it enters vessel 36. The cooling is a function of the temperature at which the cooling liquid is maintained and of the quantity of the cooling liquid used, which may be the liquid constituting the dispersing phase of the emulsion (vehicle for the molten product) or any other suitable liquid coolant.

The solid spherical particles of the starting molten product formed by cooling of the dispersed phase of the emulsion are separated from the dispersing phase in any suitable way, as by decanting or filtering.

The following examples are given to illustrate the process of the invention in more detail and are not intended to be limiting.

EXAMPLE 1

Forty eight g of anhydrous magnesium chloride, 77 g of anhydrous ethyl alcohol and 830 ml of kerosene were loaded under an inert gas atmosphere and at room temperature, into a 2 liter heating vessel 10 fitted with a turbine powered stirrer 16 and an outlet pipe 30.

The mixture was then heated to 120° C. under stirring, whereby there formed an adduct between $MgCl_2$ and the alcohol, which adduct melted and remained mixed with the dispersant.

A nitrogen gas pressure of 15 kg/sq.cm. was maintained in the vessel 10 through pipe 18. The outlet pipe 30 of the vessel 10 was heated externally, in heating sleeve 34, to 120° C., and had an inner diameter of 1 mm and a length of 3 meters though heating sleeve 34. The valve 32 was opened to allow the mixture to flow through pipe 30 at a speed of about 7 m/sec. At the outlet 30A of the pipe 30, the dispersion was discharged into a 5 liter vessel 36 fitted with a stirrer 38, and containing 2.5l of kerosene, the vessel was cooled externally in chamber 40 which was maintained at the initial temperature of −40° C.

The final temperature of the emulsion discharged into vessel 36 was 0° C.

The spheroidal solid product that formed the dispersed phase of the emulsion, was separated by decanting and filtering, washed with heptane and dried.

All of the foregoing operations were carried out under an atmosphere of an inert gas.

There were obtained 130 g of $MgCl_2.3C_2H_5OH$ containing about 20% of solvent, that are in the form of solid spheroidal particles having a maximum diameter of less than 50 microns and a mean weight diameter of 19 microns. The solid product, dried under vacuum for 2 hours, weighed 105 g.

The bulk density of the product amounted to 0.53 g/cu.cm.

EXAMPLE 2

Example 1 was repeated with the difference that vaseline oil was used as the dispersing liquid and the linear outflow speed of the mixture in the pipe 30 through heating sleeve 34 amounted to 4.5 m/sec, with a pressure in the heating vessel 10 of 10 kg/sq.cm. Anhydrous heptane was used as the cooling liquid in chamber 40.

There were obtained 130 g of solid spheric product of formula $MgCl_2.3C_2H_5OH$ containing about 17% of solvent, corresponding to 108 g of product dried under vacuum for 2 hours. This product had the following characteristics:

| | |
|---|---|
| maximum diameter | 50 microns |
| mean weight diameter | 21 microns |

| | |
|---|---|
| -continued | |
| bulk density | 0.64 g/cu. cm. |

EXAMPLE 3

Example 2 was repeated except that the amount of $C_2H_5OH$ loaded into the heating vessel 10 was 116 gms. instead of 77 grams, the temperature being maintained at 100° C.

There were obtained about 164 g of product $MgCl_2.5C_2H_5OH$ containing about 18% of solvent. This product, dried under vacuum for 2 hours, weighed 135 g. It was a spherical solid showing the following characteristics:

| | |
|---|---|
| maximum diameter | <50 microns |
| mean weight diameter | 17 microns |
| bulk density | 0.62 g/cu. cm. |

EXAMPLE 4

Example 2 was repeated, except that the materials loaded into the heating vessel 10 were 130 g of magnesium chloride hexahydrate solid at room temperature and 830 cc of vaseline oil. The whole was then heated to 140° C.

There were obtained about 130 g of spherical product $MgCl_2.6H_2O$ containing about 12% of solvent, corresponding to 114 g of dry product having the following characteristics:

| | |
|---|---|
| maximum diameter | <50 microns |
| mean weight diameter | 15 microns |
| bulk density | 0.47 g/cu. cm. |

EXAMPLE 5

Example 1 was repeated with the exception that the following variations were used:

| | |
|---|---|
| dispersed phase | commercial urea |
| inside diameter of pipe | 3 mm |
| dispersing medium | dodecane. |

Into the autoclave were loaded 135 g of solid urea at room temperature. The autoclave, heated to 130° C., was put under an inert gas pressure of 2 Kg/sq.cm. The linear outflow velocity of the mixture in the pipe amounted to 2.2 m/sec.

About 135 g of spheroidal solid urea were obtained, containing about 15% of solvent, corresponding to 115 g of dry product. It showed the following particle size distribution:

| microns | % by weight |
|---|---|
| 100–150 | 78.9 |
| 75–100 | 14.6 |
| 50–75 | 4.4 |
| 30–50 | 2.1 | bulk density = 0.865 g/cu. cm;
flowability: 8 seconds (ASTM D-1895/69, Method A).

EXAMPLE 6

The operation was as in Example 5, with the exception that a linear outflow speed of 0.3 m/sec. was used.

The particle size analysis of the spheroidal product gave the following results:

| microns | % by weight |
|---|---|
| <1000 | 29.2 |
| 500–1000 | 31.8 |
| 125–500 | 34.0 |
| <125 | 5.0 | bulk density: 0.85 g/cu. cm
flowability: 9 seconds

EXAMPLE 7

The procedure was as in Example 1, except that the dispersed phase consisted of a polypropylene with a mean molecular weight of 1500, while the continuous phase consisted of a mixture of ethylene glycol and water at 50% by weight, the inner diameter of the pipe being of 3 mm.

Into the heating vessel were then loaded 75 g of solid polypropylene at room temperature, in a ponderal ratio 0.15 with the continuous phase. The whole was then heated to 125° C. under stirring for 1 hour, after which the mixture was discharged through the pipe pressurized to 2 kg/sq.cm. of nitrogen. The product was gathered in a flask fitted with a stirrer and containing a 50% ethylene glycol/water mixture, cooled to −20° C. The solid spheroidal polymer was separated and dried. Thereby were obtained about 70 g of polymer in a spheroidal shape with a maximum diameter of the particles of below 500 microns.

What is claimed is:

1. Process for converting a molten product into a spheroidally shaped product solid at room temperature and having a diameter of from 1 to 5,000 microns, said molten product being selected from the group consisting of organic and inorganic compounds having a melting point comprised between 20° C. and 400° C., which process comprises forming a uniform mixture of the molten product with at least one liquid immiscible therewith and chemically inert thereto, and in a ratio such that the molten product will form a continuous phase, emulsifying the mixture by passing it under turbulence in a tube having a length greater than 50–100 times the inner diameter thereof and which latter is at least 3–4 times the maximum diameter of the spheroidal particles to be obtained, to produce an emulsion, quenching the emulsion by mixing it with an inert liquid at a temperature to solidify the molten liquid dispersed in the emulsion, and recovering the resulting solid spheroidal particles.

2. The process of claim 1, in which the dispersed phase is an adduct of a magnesium halide and an alcohol, and the continuous phase is a hydrocarbon liquid present in the mixture in a ratio of 0.1 to 0.3, inclusive.

3. The process of claim 1, in which the homogeneous mixture of the molten liquid and the liquid immiscible therewith has an interfacial tension of between 100 and 10 dyne/cm and is caused to flow in the tube at a linear speed of from 2 to 20 m/second.

4. The process of claim 1, in which the dispersed phase is urea and the dispersing phase a hydrocarbon liquid, the interfacial tension between the two liquids being greater than 30 dyne/cm, and the mixture being caused to flow in the tube at a linear speed of from 0.2 to 2 m/second.

5. The process of claim 1, in which the emulsion is quenched with an inert liquid maintained at a temperature and used in an amount sufficient to insure solidification of the dispersed molten liquid.

6. The process of claim 5, in which the quenching liquid is the same as the liquid forming the dispersing liquid of the emulsion.

* * * * *